Nov. 25, 1969   H. E. DE BUHR ET AL   3,479,894
BELT TENSIONING DEVICE
Filed Feb. 28, 1968

*INVENTORS*
H.E. deBUHR
L.W. COFER

United States Patent Office 3,479,894
Patented Nov. 25, 1969

3,479,894
BELT TENSIONING DEVICE
Harold Eugene deBuhr and Larry Wilson Cofer, Ottumwa, Iowa, assignors to Deere & Company, Moline, Ill., a corporation of Delaware
Filed Feb. 28, 1968, Ser. No. 708,886
Int. Cl. F16h 7/12
U.S. Cl. 74—242.11                    8 Claims

ABSTRACT OF THE DISCLOSURE

A belt drive having an idler mounted on a swingable arm, which is acted on by a tensioning device. The device includes a stop which limits movement of the idler away from the belt, the device being preferably adjusted so that in normal operation, the stop is engaged and the idler functions as a fixed idler. The device also includes a spring which biases the idler toward the belt, so that when the belt stretches due to increased loads, the idler follows the belt and functions as a spring-loaded idler.

Background of the invention

This invention relates to a mechanism for biasing an idler against an endless flexible drive element, such as a belt or the like, to maintain the proper tension in the element.

Numerous different designs of belt tightening mechanisms are available. Basically, such mechanisms fall into two different categories, namely, fixed idlers and spring-loaded idlers. While the former can generally be adjusted at intervals to compensate for wear on the belt, they are maintained in a fixed position during operation of the drive, and, accordingly, cannot shift to maintain proper belt tension when increased belt loads cause the belt to stretch. On the other hand, a spring-loaded idler is free to follow the belt, regardless of load induced changes in belt length. However, when the drive is subjected to intermittent peak loads, the spring-loaded idler will often tend to bounce on the belt, decreasing the belt life.

Summary of the invention

According to the present invention, a belt tensioning mechanism is provided which incorporates the advantages of both the fixed and the spring-loaded idler, while eliminating the disadvantages of both types of idlers. More particularly, the belt tensioning mechanism functions as a fixed idler in the direction away from the belt, so that the idler will not bounce on the belt, while it acts as a spring-loaded idler in the opposite direction, so that the idler follows the belt when increased belt loads cause the belt to stretch.

Another object of the invention is to provide such a mechanism with means for adjusting the belt tension during normal operation of the drive and further to provide means for adjusting the belt tension provided by the spring when the idler is acting as a spring-loaded idler. Also, according to the invention, means are provided for quickly releasing the tensioning mechanism to disengage the idler from the belt.

Still another object is to provide a compact, economical, efficient, and rugged arrangement of components in the tensioning mechanism and in the means for adjusting the tension and releasing the idler.

Description of the preferred embodiments

Figure 1:
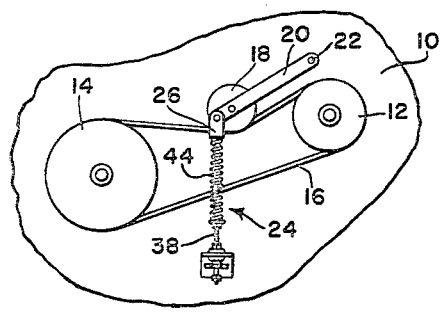
FIG. 1 is a side elevation view of a belt drive incorporating the belt tensioning mechanism.

An embodiment of the invention is illustrated in a simple belt drive, which is shown in FIG. 1. The drive is mounted on a supporting structure 10 and includes a drive sheave 12, a driven sheave 14, and an endless flexible belt 16 trained around the drive and driven sheaves. An idler pulley or sheave 18 is engageable with the top of the upper run or slack side of the belt 16 and is mounted on a lever arm 20 swingably mounted on a pivot 22 for movement toward and away from the belt 16 to respectively increase and decrease the deflection of the belt. The pivot 22 is axially parallel to the drive and driven sheaves and the idler 18.

Figure 3:
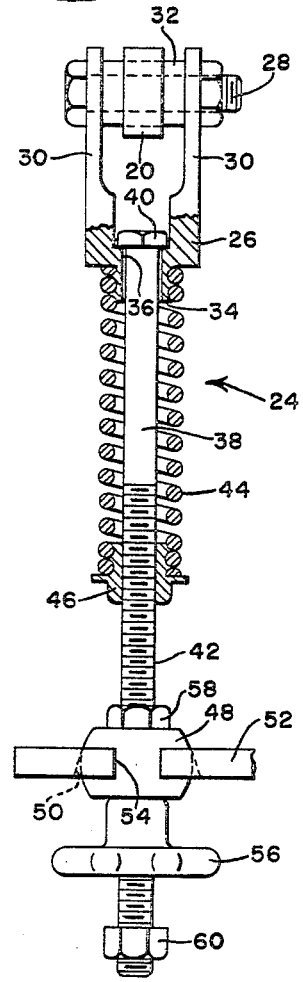
FIG. 3 is a front elevation view of the mechanism shown in FIG. 2, but showing the mechanism in an operating condition and with portions of the mechanism broken away to more clearly illustrate the invention.

The idler 18 is biased against the belt by a tensioning mechanism, indicated in its entirety by the numeral 24. The mechanism includes a yoke-like bifurcated tension member 26, which is swingably connected to the end of the arm 20 by a pivot 28 parallel to the axis of the idler 18 and extending through the upper ends of the opposite arms 30 of the member 26 and through the end of the arm 20. A bushing 32 is mounted on the pivot 28 and extends through the arm 20 and between the tension member arms 30. The member 26 has a relatively short intermediate or stem portion 34, which is provided with a cylindrical bore or aperture 36 extending parallel to the arms 30. As best seen in FIG. 3, the upper portions of the arms 30 are more widely separated than the lower portions.

Figure 2:
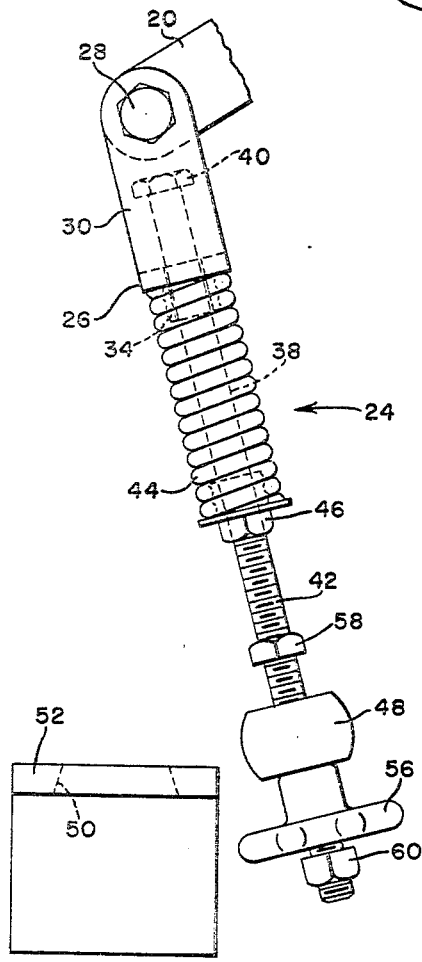
FIG. 2 is an enlarged side elevation view of the tensioning mechanism only, with the mechanism shifted to a released position.

An elongated bolt-like rod or shaft 38 is slidably mounted in the bore 36 and has a stop 40 formed by a conventional hex head at its upper end. The stop is engageable with the portion 34 to limit the downward movement of the rod 38 relative to the tension member 26. The maximum width of the head 40 across the opposite angles is greater than the separation between the lower portions of the arms but less than the separation between the upper portions, so that the rod is rotatable only when it is elevated, as shown in FIG. 2.

The rod has a relatively long threaded portion 42 extending to the lower end of the rod. Coaxially mounted around the rod is a helical-type tension spring 44 having its upper end rigidly connected to the intermediate portion 34 of the tension member and its other end attached to an internally threaded plug 46 threadable on the threaded portion 42 of the rod.

The rod 38 is releasably connected to the supporting structure through a spherical member 48 having parallel truncated upper and lower surfaces and an axial bore normal to the truncated surfaces, the member 48 being axially slidable on the threaded portion 42 of the rod. The member 48 is insertable into a frusto-conical socket 50 formed in an inverted L-shaped bracket 52 attached to the supporting structure 10, the diameter of the spherical member 48 being greater than the smaller diameter of the socket 50, as best seen in FIG. 3, so that the member 48 is locked against upward movement through the socket while it is free to move downwardly from the socket. A passage 54 in the bracket connects the socket 50 to the exterior, the passage 54 having a slightly greater width than the diameter of the rod 38 but substantially less than the diameter of the member 48, so that the rod, and the spherical member 48 mounted thereon, can be removed from the socket 50 only by first moving the member 48 downwardly, so that it clears the bracket 52, and then swings the rod 38 laterally through the passage.

The spherical member 48 is provided with an annular handle 56 having an internally threaded bore threadable on the threaded portion 42 of the rod, so that rotation of the handle shifts the member 48 along the rod. Upper and lower lock nuts 58 and 60 are respectively threaded on the threaded portion 42 of the rod on opposite sides of the member 48.

To initially adjust the mechanism 24, the mechanism is shifted to its released or disengaged position as shown in FIG. 2, relieving the tension on the idler 18. The mechanism is released by shifting the member 48 down the rod by rotating the handle 56 until the force exerted by the spring 44 is small enough and the clearance between the stop 40 and the member 26 is large enough to permit the member 48 to be pulled downwardly from the socket 50, whereupon the rod 38 is swung laterally through the passage 54. With the spring 44 in its undeflected position as shown in FIG. 2, the rod is then rotated, the relative rotation between the rod and the threaded plug 46 shifting the rod in an axial direction. As previously described, the rod can only be rotated when its head or stop 40 is disposed between the upper or more widely separated portions of the arms 30. Since the maximum extension of the spring 44 is determined by the clearance between the stop 40 and the intermediate portion 34 of the tension member, the rod is adjusted axially until the desired clearance is obtained. The rod is then swung back into its engaged position wherein the spherical member 48 is seated in the socket 50. The member 48 is then moved up the rod by rotating the handle 56, shifting the rod 38 downwardly and stretching the tension spring 44 until the head or stop 40 engages the member 26, as shown in FIG. 3.

Preferably, the tension in the belt 16 urging the idler 18 upward is slightly greater than the force exerted by the spring 44 urging the idler downwardly, so that the tension member 26 is maintained against the stop 40. If the spring force exceeds the belt tension force, the member 26 will be pulled away from the stop 40 so that the idler 18 will function as a conventional spring-loaded idler. Thus, to utilize the advantages of the present invention, the member 26 should engage the stop during normal operation of the drive. The upper lock nut 58 is tightened against the member 48 after the device is adjusted into its preferred operating position. The lower stop nut 60 merely functions as a gauge by which the operator is able to determine the distance which the member 48 must be threaded for release of the mechanism, and also as a stop to prevent loss of the handle and member 48.

When the mechanism is in its operating position, as shown in FIG. 3, the mechanism functions as a fixed idler during normal operating conditions, the belt tension being sufficient to maintain the stop 40 against the member 26. However, a conventional belt stretches during peak loads, and when this occurs, the tension in the upper run or slack side of the belt decreases and the upper run of the belt will start to sag away from the idler. However, when this occurs, the spring 44 will pull the member 26 downwardly away from the stop 40, so that the mechanism now functions as a spring-loaded idler, maintaining the proper tension in the belt. As soon as the increased load is removed, and the belt returns to its normal length, the belt will pull the member 26 upwardly against the stop 40, whereupon the mechanism again functions as a fixed idler to prevent the idler from bouncing on the belt.

Normal wear and use of the belt causes the belt to stretch slightly, so that the member 26 moves away from the stop. Thus, it is necessary to periodically adjust the mechanism to maintain the member 26 against the stop 40. The adjustment is easily accomplished by simply loosening the lock nut 58 and shifting the member 48 by rotating the handle 56 to shift the rod 38 downwardly until the stop 40 engages the member 26.

The release mechanism can also be utilized to completely disengage the idler from the bolt by merely propping the handle on top of the bracket 52, thereby forcing the upper end of the rod upwardly against the arm 20 to shift the arm upwardly, causing the idler to lift from the belt.

Figure 4:
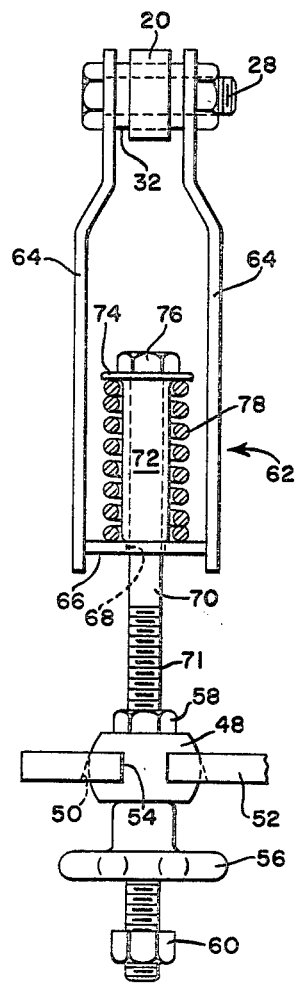
FIG. 4 is a view similar to FIG. 3, showing a second embodiment of the invention.

A slightly different embodiment of the invention is shown in FIG. 4, although the mechanism functions in much the same manner as the previously described mechanism. The mechanism again includes a yoke-like or U-shaped tension member 62, the opposite legs 64 of which swingably depend from the pivot 28 carried by the end of the arm 20. The member 62 includes an intermediate or bight portion 66 having a cylindrical bore 68 extending in the same general direction as the legs 64. An elongated bolt-like rod or shaft 70 is axially shiftable and rotatable in the bore 68 and again includes an elongated threaded portion 71 in its lower end. An elongated sleeve 72 having a larger outside diameter than the bore 68 is mounted around the upper end of the rod 70, which is axially slidable relative to the sleeve 72. The sleeve has an annular abutment 74 at its upper end engageable with a head or stop 76 on the upper end of the rod 70. A helical-type compression spring 78 is coaxially mounted around the sleeve 72 and its upper end engages the abutment 74 while its lower end engages the intermediate portion 66 of the member 62, the spring biasing the member 62 downwardly relative to the rod 70.

The undeflected length of the spring is somewhat greater than the length of the sleeve 72, and the spring is selected so that when it is compressed to the same length as the sleeve 72, it exerts a downward force on the member 62 that is slightly less than the upward force exerted by the belt, when the desired amount of tension is provided in the belt. Thus, in normal operating conditions, the spring is compressed so that its lower end is flush with the lower end of the sleeve 72, as shown in FIG. 4, the lower end of the sleeve 72 engaging the intermediate portion 66 of the member 62 to prevent additional deflection of the spring or upward movement of the member 62 relative to the rod 70.

As in the previous embodiment, the mechanism functions as a fixed idler during normal operation of the drive, and is maintained in the condition shown in FIG. 4. If the belt stretches due to increased loads, thereby decreasing tension in the belt to a point wherein the upward force exerted by the belt on the member 62 is less than the spring force, the spring will extend, forcing the member 62 downwardly so that the idler follows the belt. In this condition, the lower end of the sleeve 72 is spaced from the intermediate portion 76. When the additional belt load is removed, and the belt returns to its original length, the member 62 will again move upwardly relative to the rod 70, compressing the spring 78 until the member engages the lower end of the sleeve 72, whereupon the mechanism will again function as a fixed idler. If the belt stretches permanently due to wear and use, the spring 78 will force and maintain the member 62 away from the stop formed by the lower end of the sleeve 72, whereupon the mechanism functions solely as a spring-loaded idler. Again, when this condition is observed, the lock nut 58 is loosened, and the rod 70 is adjusted downwardly by rotating the handle 56 until the lower edge of the sleeve again seats against the member 62, so that the mechanism again functions as a fixed idler during normal operation of the drive.

We claim:

1. In a power transmitting device mounted on a supporting structure and including an endless, flexible, power transmitting element, an idler engageable with the endless flexible element to deflect and thereby provide tension in said element, and means mounting the idler on the supporting structure for movement in opposite directions to respectively increase and decrease the deflection of said element, the improvement comprising: a tension member connected to the mounting means and having an aperture; an elongated rod disposed in said aperture and longitudinally shiftable therein; connecting means associated with the rod for connecting it to the supporting structure; a helical spring means disposed about the rod and operative between the rod and the tension member for biasing the tension member and the idler mounting means connected thereto toward a deflection increasing direction; and stop means operative between the rod and the tension member to limit the deflection of the spring means, thereby limiting the movement of the idler mounting means in its deflection decreasing direction.

2. The invention defined in claim 1 and including adjusting means operatively associated with the stop means for selectively varying the limited position of the tension member and thereby the minimum deflection of the flexible element.

3. The invention defined in claim 2 wherein the adjusting means is included in the connecting means and is operative between the rod and the supporting structure to vary the axial position of the rod relative to the supporting structure.

4. The invention defined in claim 3 wherein the spring means is a helical tension spring having one end connected to the tension member and the other end connected to the rod.

5. The invention defined in claim 4 and including means for shifting the connection of the tension spring to the rod axially along the rod to vary the spring force on the tension member for a given position of the rod relative to the tension member.

6. The invention defined in claim 3 wherein the spring means is a helical compression spring operative between one end of the rod and the tension member.

7. The invention defined in claim 2 wherein the connecting means between the rod and the supporting structure includes a manually actuatable release mechanism operative to disconnect the rod from the supporting structure.

8. The invention defined in claim 1 wherein the rod includes an externally threaded portion at one end and the stop means is mounted on the rod at the other end, the connecting means including an internally threaded member manually threadable on the threaded portion to selectively vary the distance on the rod between the stop means and the supporting structure.

References Cited

UNITED STATES PATENTS

| | | | |
|---|---|---|---|
| 315,202 | 4/1885 | Willford | 74—242.11 XR |
| 1,744,746 | 1/1930 | Brown | 74—242.11 |
| 2,343,084 | 2/1944 | Rich et al. | |
| 2,663,195 | 12/1953 | Horan. | |
| 2,806,382 | 9/1957 | Gehrke | 74—242.11 |
| 2,876,549 | 3/1959 | Adamson et al. | |

FRED C. MATTERN, Jr., Primary Examiner

JAMES A. WONG, Assistant Examiner